United States Patent
Itabashi et al.

(10) Patent No.: US 6,329,777 B1
(45) Date of Patent: Dec. 11, 2001

(54) MOTOR DRIVE CONTROL APPARATUS AND METHOD HAVING MOTOR CURRENT LIMIT FUNCTION UPON MOTOR LOCK

(75) Inventors: Toru Itabashi, Anjo; Yukihide Niimi, Chita-gun, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/391,046

(22) Filed: Sep. 7, 1999

(30) Foreign Application Priority Data

Nov. 18, 1998 (JP) .................................................. 10-328249

(51) Int. Cl.⁷ ....................................................... H02P 7/00
(52) U.S. Cl. .......................... 318/434; 318/432; 318/452; 318/466; 318/626
(58) Field of Search ..................................... 318/432–434, 318/445–447, 452, 466–468, 592, 254, 560, 567, 599, 626

(56) References Cited

U.S. PATENT DOCUMENTS

| | | | |
|---|---|---|---|
| 3,760,250 | * | 9/1973 | Pearsall et al. ........................ 318/282 |
| 4,262,225 | * | 4/1981 | Hildebrandt et al. ............... 310/68 E |
| 4,433,370 | * | 2/1984 | Karadsheh et al. .................. 318/434 |
| 5,199,401 | * | 4/1993 | O'Neil ................................. 180/197 |
| 5,350,988 | * | 9/1994 | Le ......................................... 318/254 |
| 5,675,231 | * | 10/1997 | Becerra et al. ....................... 318/254 |
| 5,712,550 | | 1/1998 | Boll et al. ............................. 318/434 |
| 5,818,178 | * | 10/1998 | Marumoto et al. ................... 318/254 |
| 5,831,403 | * | 11/1998 | Kanki et al. .......................... 318/286 |
| 5,934,398 | * | 8/1999 | Hotta ..................................... 318/434 |
| 6,012,437 | * | 1/2000 | Radhamohan et al. .............. 318/611 |
| 6,034,494 | * | 3/2000 | Kitamine et al. ..................... 318/254 |
| 6,091,887 | * | 7/2000 | Dieterle et al. ....................... 318/599 |

* cited by examiner

*Primary Examiner*—David S. Martin
(74) *Attorney, Agent, or Firm*—Nixon & Vanderhye P.C.

(57) ABSTRACT

A direct current motor for an engine throttle control is driven with a motor current of 100% duty ratio, when a throttle valve is to be moved from one throttle position to another or when the movement of the throttle valve is to be braked. The motor current is limited to a limit level, when the motor locks, that is, when the motor current continues to be in excess of the limit level for more than a predetermined period. The motor may be driven with a limited current at initial stages of moving the throttle valve, and with a further limited current when the motor lock is detected. The motor current is finally shut off, when the throttle valve is not rotated to the target position after the continuation of the limitation of the motor current for more than a predetermined period.

6 Claims, 7 Drawing Sheets

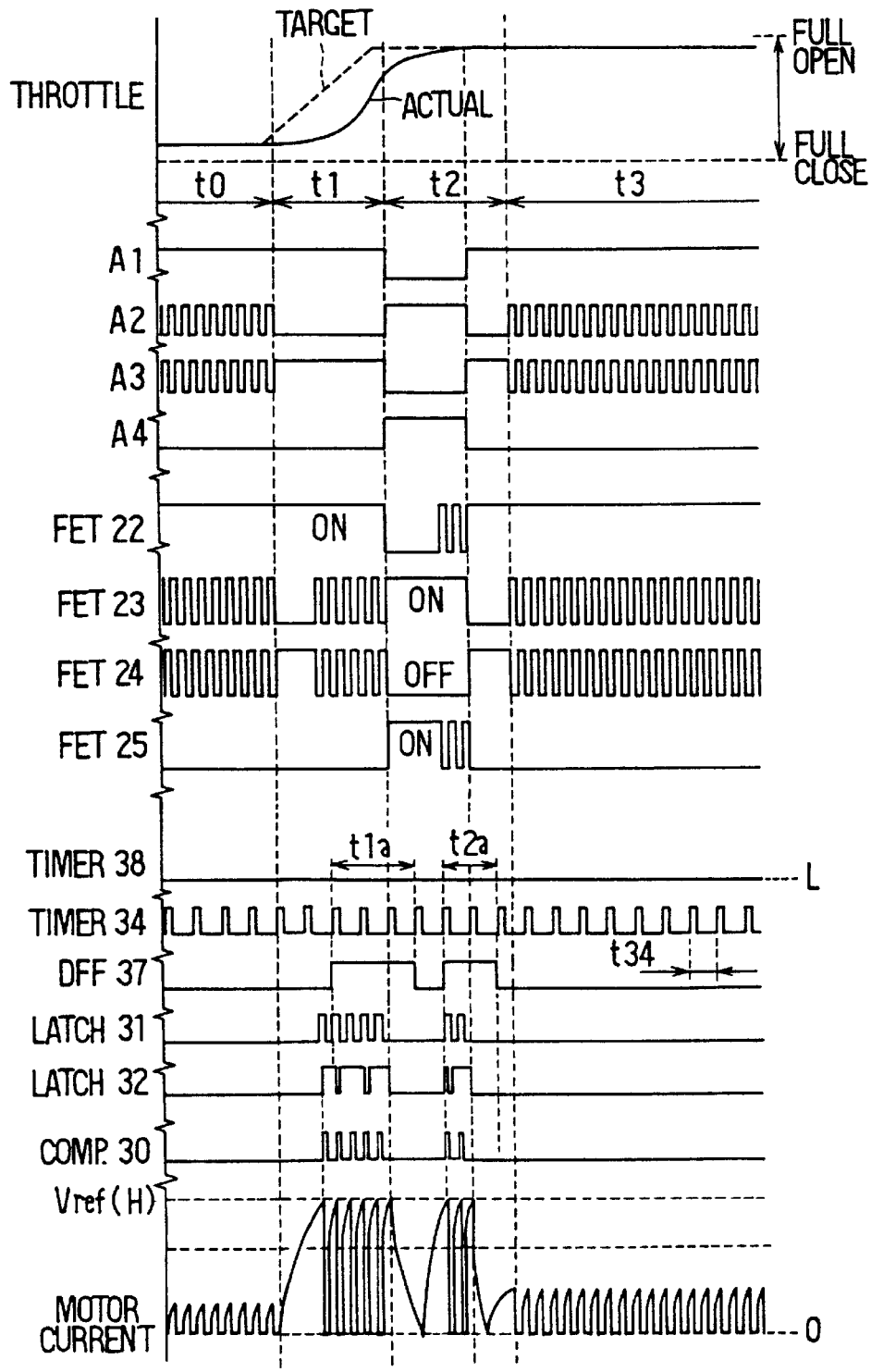

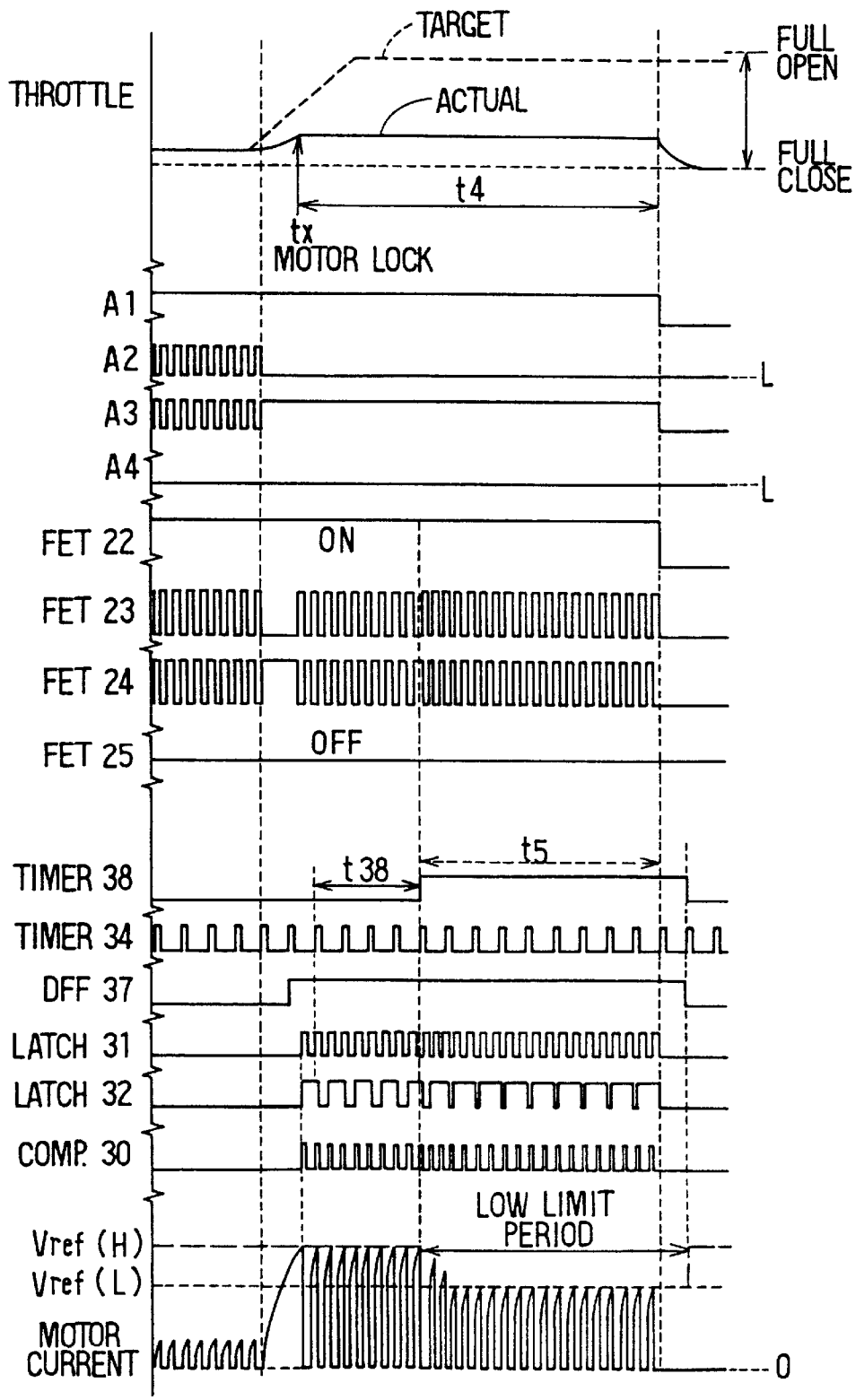

MOTOR DRIVE CONTROL APPARATUS AND METHOD HAVING MOTOR CURRENT LIMIT FUNCTION UPON MOTOR LOCK

CROSS REFERENCE TO RELATED APPLICATION

This application relates to and incorporates herein by reference Japanese Paten Application No. 10-328249 filed on Nov. 18, 1998.

BACKGROUND OF THE INVENTION

1. Field of the Invention

The present invention relates to a motor drive control apparatus and method having a motor current limit function, which can be applied to a motor driven throttle valve control in an internal combustion engine.

2. Related Art

In a motor driven throttle control apparatus for vehicles, a direct current motor is coupled to a throttle valve of an internal combustion engine. The motor is driven with an electric current (motor current) of 100% duty at the time of starting the motor drive from one position to another to improve responsiveness of the throttle valve. The motor current is reversed temporarily to brake the motor so that the throttle valve is stopped at a target throttle position or angle, when the throttle valve rotates to a position near the target throttle position. The current increases excessively when the motor locks due to jamming of foreign obstacles with the throttle valve. The current is shut off to protect semiconductor switching devices, when the motor lock is detected based on the condition that the throttle valve does not rotate to the target position within a predetermined time period.

The motor tends to lock slightly when water on the throttle valve freezes. However, the motor will rotate again normally when the supply of the motor current is continued, unless the degree of freezing is substantial. If the time period for the motor lock detection is set short, the current is shut off unnecessarily even when the motor lock is nominal, such as when the degree of freezing is not substantial. If the time period for the motor lock detection is set long, semiconductor switching devices of large size and cost are required.

In U.S. Pat. No. 5,712,550, a motor current is limited to below a predetermined level to reduce the power capacity and cost of semiconductor switching devices. However, the motor drive with the limited motor current will result in insufficiency of the drive torque for starting the motor drive from one rotation position to another and the braking force for braking the motor, thereby lessening the responsiveness of the throttle valve.

SUMMARY OF THE INVENTION

It is therefore an object of the present invention to provide a motor drive control apparatus and method, which enables a continued supply of motor current upon detection of a motor lock without lessened responsiveness and increased size and cost of switching devices.

According to the present invention, a motor is driven with a high motor current for a larger torque during the initial stage of motor drive, and thereafter with a low motor current lower than the high motor current. As the high motor current is only for the motor drive starting period, the size and cost of switching devices need not be increased. Thus, the supply of motor current can be continued for some period of time to counter the nominal motor lock.

According to the present invention, a motor is braked with a high motor current for a larger torque during a motor braking, and thereafter with a low motor current lower than the motor current supplied during the motor braking. Thus, the motor braking performance can be improved, and the heating of semiconductor switching devices can be reduced because of reduction of the motor current after the motor braking.

Preferably, the high motor current and the low motor current during the motor drive starting operation and the motor braking operation are limited to predetermined levels, respectively. Further, the motor current in shut off, when a control object driven by the motor does not attain a target position for more than a predetermined reference period.

BRIEF DESCRIPTION OF THE DRAWINGS

The above and other objects, features and advantages of the present invention will become more apparent from the following detailed description made with reference to the accompanying drawings. In the drawings:

FIG. 6 is a timing diagram showing a normal operation of the second embodiment; and FIG. 7 is a timing diagram showing a motor lock operation of the second embodiment.

DETAILED DESCRIPTION OF THE PREFERRED EMBODIMENT

Figure 1:
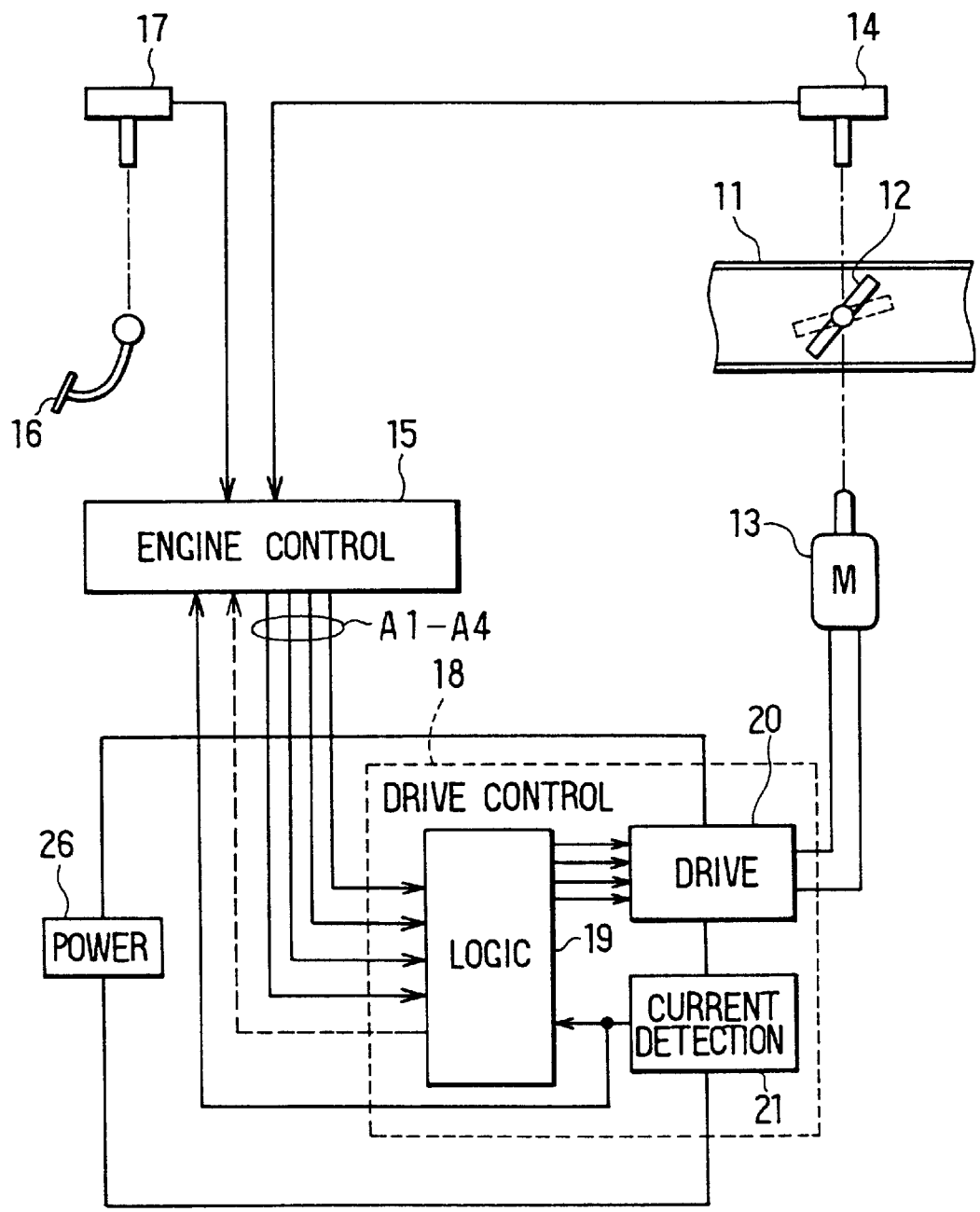
FIG. 1 is a schematic diagram showing a motor drive control apparatus applied to an electronic throttle control according to a first embodiment of the present invention.

The present invention will be described in detail with reference to embodiments of a motor drive control apparatus applied to an electronic throttle control for vehicle engines. Same or like reference numerals designates the same or like parts throughout the embodiments.

First Embodiment

Referring first to FIG. 1, a throttle valve 12 disposed rotatably as a control object in an engine intake pipe 11 is coupled to an electrically-driven direct current motor 13. The throttle valve 12 is normally biased in the closing direction by a return spring (not shown), so that the throttle valve 12 may be returned to a closed or idle position upon failure of the motor operation. Thus, the motor 13 is required to produce a torque for driving the throttle valve 12 in the opening direction against the return spring. As the torque of the motor 13 should be large enough to start rotating the throttle valve 12 from its stationary position (e.g., closed position) and to brake the motor 13 in the course of the motor rotation, the electric current to the motor 13 should be increased during the motor drive starting operation and the motor braking operation.

A throttle sensor 14 is coupled with the throttle valve 12 to detect a throttle position or throttle opening degree. An accelerator sensor 17 is coupled with an accelerator pedal 16 to detect an accelerator position or accelerator stroke. The output signals of the throttle sensor 14 and the accelerator sensor 17 are applied to an engine control circuit 15, which in turn controls the throttle valve 12 through the motor 13 as well as ignitions and fuel injections of the engine.

The engine control circuit 15 produces drive command signals A1–A4 to a drive control circuit 18 in correspondence with the output signals of the throttle sensor 14 and the accelerator sensor 17. Thus, the drive control circuit 18 drives the motor 13 to rotate the throttle valve 12 to a target position corresponding to the detected actual accelerator position.

The drive control circuit 18 includes a drive logic circuit 19 to which the drive command signals A1–A4 are applied from the engine control circuit 15, an H-bridge type drive circuit 20 which drives the motor 13, and a current detection circuit 21 which detects a motor current, i.e., an electric current supplied from the drive circuit 20 to the motor 13. The drive control circuit 18 is constructed to supply the motor current without limiting it during time periods of starting and braking the motor 13, and limiting it to a lower level during the other time periods, i.e., after the motor drive starting period and the motor braking period.

If the motor 13 locks in the motor drive starting period, for instance, the motor current is limited. If the motor 13 ceases to lock during the current limiting operation, the current limitation is released. However, if the throttle valve 12 does not rotate to the target throttle position within a predetermined time period, the engine control circuit 15 determines it to be the motor lock and stops the supply of the motor current to the motor 13.

Figure 2:
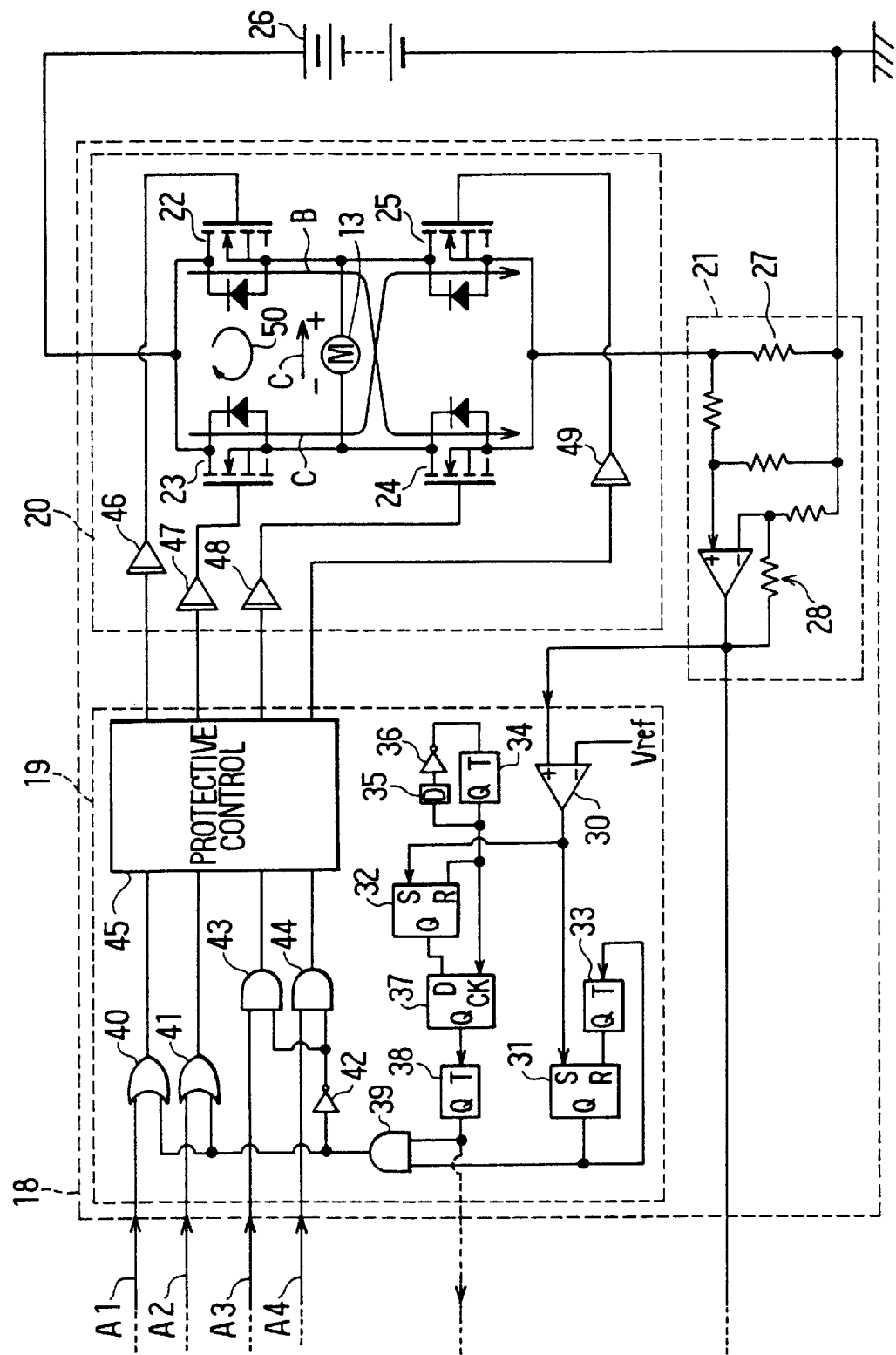
FIG. 2 is an electric wiring diagram showing a drive control circuit used in the first embodiment.

The drive control circuit 18 is shown in more detail in FIG. 2. In the drive circuit 20, four semiconductor switching devices such as MOSFETs 22–25 are connected in H-bridge type. The positive (+) and negative (−) terminals of the motor 13 is connected to a junction between the MOSFETs 22 and 25 and to a junction between the MOSFETs 23 and 24, respectively. The high-side (MOSFETs 22 and 23) of the drive circuit 20 is connected to the positive (+) terminal of an electric power source 26 such as a storage battery 26. The low-side (MOSFETs 24 and 25) of the drive circuit 20 is connected to the negative (−) or grounded terminal of the battery 26 through the current detection circuit 21. The current detection circuit 21 includes a resistor 27 and a differential amplifier circuit 28. The output signal of the current detection circuit 21 indicative of the motor current flowing in the motor 13 is applied to the drive logic circuit 19.

In the drive logic circuit 19, a comparator 30 is provided to compare the output signal of the current detection circuit 21 with a reference signal Vref, which is set to correspond to the maximum limit level of the motor current. Specifically, this limit level is set low to protect the MOSFETs 22–25 from breaking even under the condition that the motor current continues to flow for a certain period at the time of motor lock. That is, the limit level is set lower than the level of the motor current which occurs at the time of motor drive starting or motor braking.

Each time the motor current exceeds the limit current level, the comparator 30 produces a high level output signal. This signal is applied to set terminals S of reset-set type RS-latches 31 and 32, which are a set-prioritized type. Output signals of timers 33 and 34 are applied to reset terminals R of the RS-latches 31 and 32.

Figure 4:
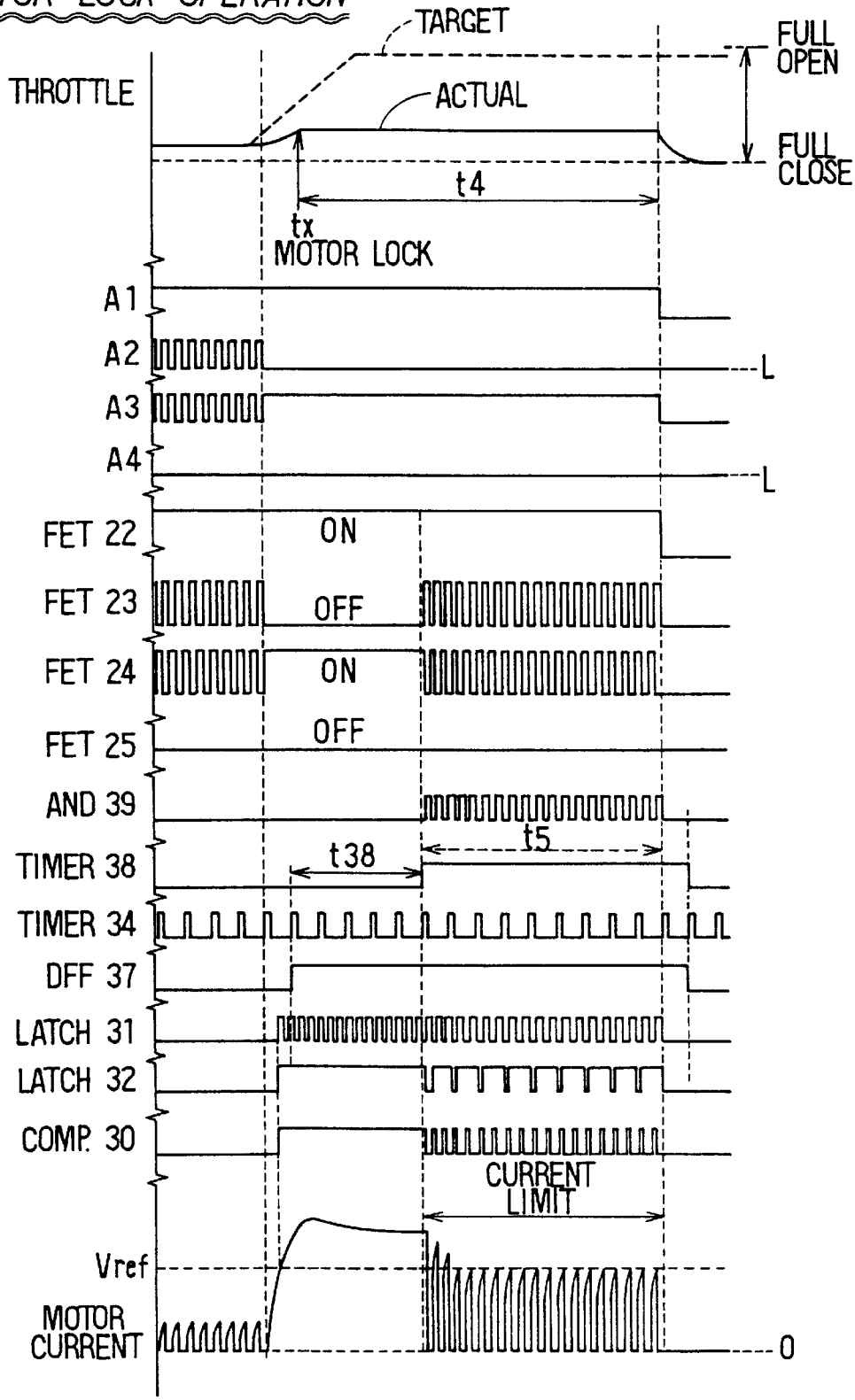
FIG. 4 is a timing diagram showing a motor lock operation of the first embodiment.

The RS-latch 31 is set in response to the high level signal of the comparator 30 indicative of the motor current being in excess of the limit level (Vref), and produces a high level output signal from its output terminal Q to the timer 33 and an AND gate 39. The timer 33 is for setting an off-period for turning off the supply of the motor current temporarily each time the motor current exceeds the limit level during the motor current limiting operation. The timer 33 starts a time count in response to the applied high level output signal, and produces a high level output signal from its output terminal Q to a reset terminal R of the RS-latch 31 when the count time reaches a predetermined or fixed reference time period. The RS-latch 31 produces a low level signal from its output terminal Q to the timer 33 and the AND gate 39. The timer 33 is reset in response to the applied low level output signal and produces a low level signal from its output terminal Q. Thus, as the RS-latch 31 and the timer 33 forms a closed loop, the RS-latch 31 produces the high level output signal for the predetermined time period each time the motor current exceeds the limit level in the course of the current limit operation, so that the motor current is reduced to zero temporarily, as shown in FIG. 4.

Figure 3:
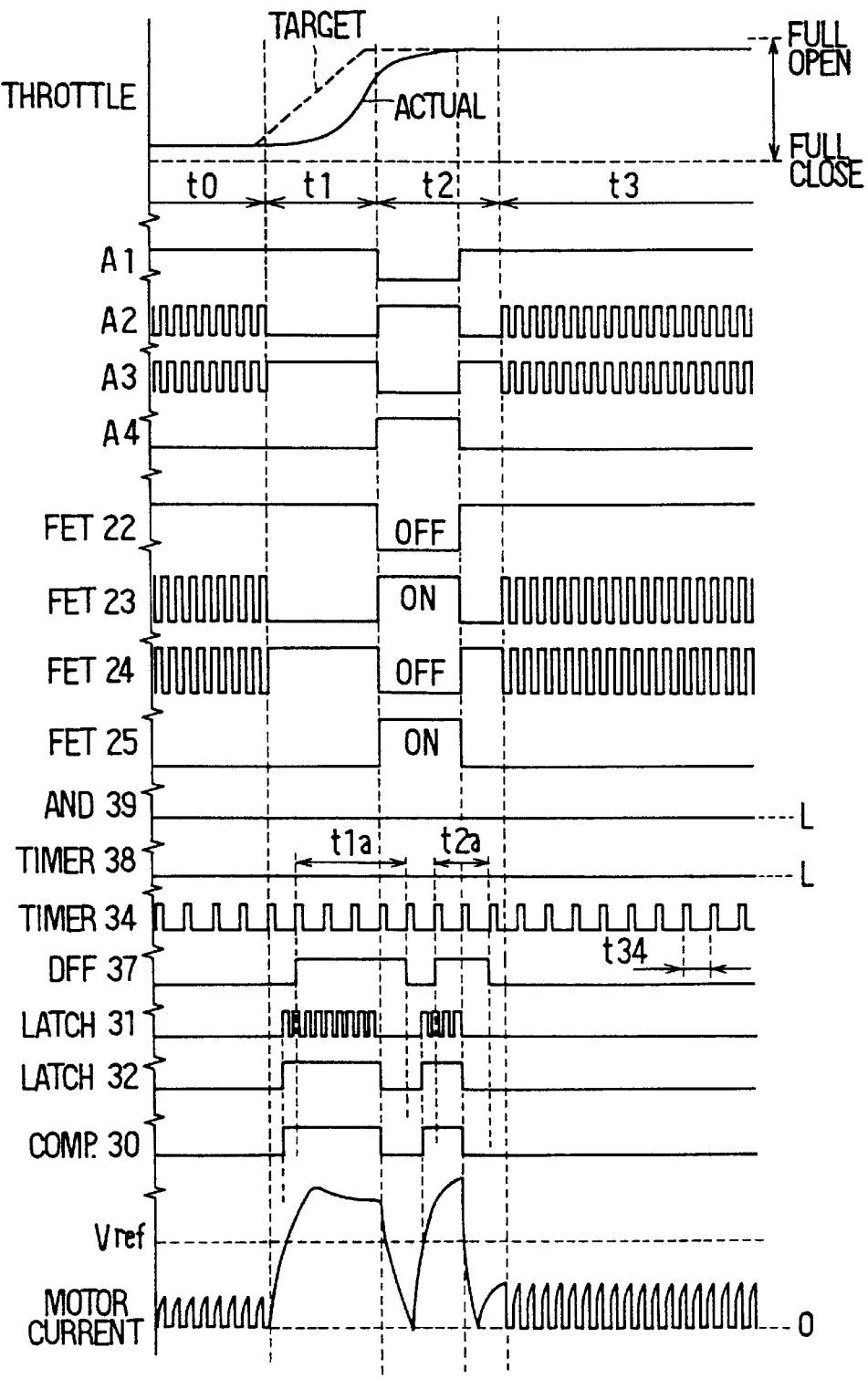
FIG. 3 is a timing diagram showing a normal operation of the first embodiment.

The RS-latch 32 receives at its reset terminal R the output signal of the output terminal Q of the timer 34, which receives the output signal of its output terminal Q at its input terminal T through a delay circuit 35 and an inverter 36. Thus, when the timer 34 reverses its output signal to a low level at its output terminal Q, the delay circuit 35 reverses to a low level after a delay time period. At the same time, a high level signal is applied to the input terminal T of the timer 34 from the inverter 36. Thus, the timer 34 starts a time count, and produces the high level output signal from its output terminal Q when the count time reaches a predetermined time period t34. This high level signal is delayed by the delay circuit 35 and applied to the inverter 36, which in turn produces the low level signal to the input terminal T of the timer 34. The timer 34 responsively resets its time count operation and reverse its output signal at the output terminal Q to the low level. As the timer 34, the delay circuit 35 and the inverter 36 form a closed loop, the timer 34 produces the high level signal for only the delay time period of the delay circuit 35 at every predetermined time period t34 set in the timer 34 as shown in FIG. 3.

The output signal at the output terminal Q of the timer 34 is applied to the reset terminal R of the RS-latch 32 and a clock input terminal CK of a D-type flip-flop (DFF) 37, which has a data input terminal D connected to the output terminal Q of the RS-latch 32.

When the RS-latch 32 receives at its set terminal S the high level signal from the comparator 30 indicating that the motor current is in excess of the limit level, the RS-latch 32 is set to produce a high level output signal from its output terminal Q to the data input terminal D of the D-type flip-flop 37. Further, the RS-latch 32 is reset in response to the high level signal of the timer 34 applied to its reset terminal R at every predetermined time period t34, and produces a low level signal from its output terminal Q to the data input terminal D of the D-type flip-flop 37.

The D-type flip-flop 37 stores and holds the output level of the output terminal Q of the RS-latch 32 applied to its data input terminal D at a timing that the output level of the timer 34 applied to its clock input terminal CK changes from low to high. The D-type flip-flop 37 thus produces a signal level which corresponds to the stored signal level to an input terminal T of a timer 38.

As the RS-latch 32 and the D-type flip-flop 37 operate as above, the high level signal is applied from the output terminal Q of the d-type flip-flop 37 to the input terminal T of the timer 38.

In this instance, the time period t34 defined by the timer 34 is set longer than a sum of the time period of temporarily shutting of the motor current supply due to the motor current in excess of the limit level during the current limit operation and the time period in which the motor current supply is restarted after the temporary shut-off and exceeds the limit level again. Thus, the output signal at the output terminal Q of the D-type flip-flop 37 is maintained at the high level in the current limit operation.

The timer 38 starts the time count to count the time periods t1a and t2a, in which the motor current is in excess of the limit level as shown in FIG. 3, upon receiving from the output terminal Q of the D-type flip-flop 37 the high level signal indicating that the motor current is in excess of the limit level. When the timer 38 completes its time count of the time period t38 (FIG. 4), the timer 38 produces a high level signal (current limit operation start signal) from its output terminal Q to the AND gate 39. The timer 38 resets its time count operation in response to the low level signal of the D-type flip-flop 37 indicating that the motor current is below the limit level, and produces the low level signal from its output terminal Q to the AND gate.

The time period t38 defined by the timer 38 is for determining a timing of starting the current limit level when the motor drive starting period or the motor braking period continues long. Thus, this time period t38 is set a little longer than the period of motor drive starting or motor braking under the normal condition, that is, under the condition of no lock. Thus, as shown in FIG. 3, the actual throttle position becomes close to the target throttle position and completes the motor drive starting or the motor braking under the normal operation condition before the count time period t1a or t2a reaches the time period t38. As a result, the motor current is not limited, so that the motor 13 is started and braked without motor current limitation. Thus, quick responsiveness of the throttle valve 12 is attained during the motor drive starting operation and the motor braking operation.

The AND gate 39 produces a high level output only when the output signal levels of the timer 38 and the RS-latch 31 are both high. Thus, the output level of the AND gate 39 is maintained low during the normal operation (FIG. 3). However, it is reversed to high only for the period of temporarily shutting off the current supply in response to each rise of the motor current above the limit level (FIG. 4).

The output signal of the AND gate 39 is applied to OR gates 40 and 41, and also to AND gates 43 and 44 through an inverter 42. The drive command signals A1–A4 are applied from the engine control circuit 15 to OR gates 40, 41 and the AND gates 43, 44. Output signals of the OR gates 40 and 41 are applied to the gates of the high-side MOSFETs 22 and 23 through a protective control circuit 45 and pre-drivers 46 and 47. Thus, the high-side MOSFETs 22 and 23 turn on when the high-side drive command signal A1 and A2 are high, respectively. Further, the MOSFETs 22 and 23 turn on when the output level of the AND gate 39 is high, i.e., when the motor current supply is shut off temporarily under the current limit operation, so that the energy remaining in coils of the motor 13 is circulated through a circulation path 50 during the period of temporarily shutting off the motor current.

The output signal of the AND gates 43 and 44 are applied to the gates of the low-side MOSFETs 24 and 25 through the protective control circuit 45 and pre-drivers 48 and 49. Thus, the MOSFETs 24 and 25 turn on, when the low-side command drive signals A3 and A4 are high and the output signal of the inverter 42 is high. During the normal operation, as shown in FIG. 3, the output signal of the AND gate 39 is maintained low and the output signal of the inverter 42 is maintained high. As a result, the drive command signals A3 and A4 passes through the AND gates 43 and 44 without signal level changes, and the MOSFETs 24 and turn on to supply the motor current to the motor 13, when the drive command signals A3 and A4 are high.

During the motor current limit operation, as shown in FIG. 4, the output signal of the AND gate 39 is reversed to high only during temporarily shutting off the motor current in response to each increase of the motor current above the limit level. Thus, the output signal of the inverter 42 is reversed to low during the same period. As a result, the output signal of the AND gate 43 or 44 temporarily changes to low each time the motor current exceeds the limit level, even under the condition that the low-side drive command signal A3 or A4 is high. Thus, the MOSFET 24 or 25 is temporarily turned off each time the motor current exceeds the limit level, so that the motor current is limited to be less than the limit level.

The protective control circuit 45 includes various logic for preventing an excessive current from flowing continuously through the motor 13 due to turning on of the MOSFETs 22–25 connected to both terminals of the motor 13, and for forcing the MOSFETs 22–25 to turn off when the excessive current continues to flow.

The operation of the first embodiment under the normal condition (no motor lock) will be described in further detail with reference to FIG. 3.

As long as the throttle valve 12 is in the stationary position during the period t0, the engine control circuit 15 maintains the drive command signal A1 high and changes the drive command signal A3 to high and low at a duty ratio determined in correspondence with the throttle position at that time. Thus, the MOSFET 22 is maintained turned on, while the MOSFET 24 is turned on and off alternately at the determined duty ratio. The motor current flows in the forward direction indicated by an arrow B in FIG. 2 to maintain the opening position of the throttle valve 12 against the return spring.

During the period t0, the drive command signal A2 is changed to high each time the drive command signal A3 changes to low. Thus, the MOSFET 23 turns on each time the MOSFET 24 turns off, so that the electromagnetic energy remaining in the coil of the motor 13 is circulated through the circulation path 50.

In the case that the target throttle position is changed with the movement of the accelerator pedal 16, the engine control circuit 15 drives the motor 13 with the motor current of 100% duty ratio during the time period t1 so that the actual throttle position approaches the target throttle position in a short period of time. That is, during this motor drive starting period t1, the drive command signals A1 and A3 are maintained high to turn on the MOSFETs 22 and 24 continuously so that the motor 13 is driven with the motor current of 100% duty ratio flowing in the forward direction (B). Thus, the drive starting torque is increased to speed up the rotating speed of the throttle valve 12. The current limit operation is not effected during this period t1, because the count time t1a of the timer 38, i.e., the period in which the motor current exceeds the limit level, does not reach the time period t38 which defines the timing for starting the current limit operation.

When the actual throttle position changes into a predetermined range from the target throttle position in the period t1, the engine control circuit 15 starts to brake the motor 13 to stop the throttle valve 12 at the target position. In the braking period t2, the MOSFETs 23 and 25 are both turned on continuously so that the motor 13 is driven with the motor current of 100% duty ratio in a reverse direction indicated by an arrow C in FIG. 2. Thus, the braking force of the motor 13 is increased to stop the throttle valve 12 at the target throttle position within a short period of time. The current limit operation is not effected in this period t2, because the count time t2a of the timer 38, i.e., the braking period in which the motor current exceeds the limit level, does not reach the time period t38 which defines the timing for starting the current limit operation. As long as the throttle valve 12 is maintained at the target position during the period t3, the motor 13 is driven with the duty-controlled motor current in the same manner as in the period t0.

The operation of the first embodiment under the motor lock condition will be described next with reference to FIG. 4. It is assumed that the motor locks at timing tx immediately after starting to drive the motor 13.

When the motor 13 locks, the throttle valve 12 will not be rotated to the target throttle position even when the motor 13 is driven with the motor current of 100% duty ratio for a certain period. Thus, the motor current in excess of the limit level continues to flow in the motor 13 for a longer period than in the normal operation (FIG. 3). If the period t1a of continuation of supplying the motor current in excess of the limit level counted by the timer 38 exceeds the time period t38, the current limit operation is effected in the following manner.

When the count time t1a of the timer 38 reaches the time period t38 set for starting the current limit operation, the timer 38 produces the high level output. The AND gate 39 produces the high level output signal only during the period in which the output signal of the RS-latch 31 is high, i.e., only for the period of temporarily shutting off the motor current. Thus, the high level signal of the AND gate 39 is inverted to the low level signal by the inverter 42 to be applied to the AND gate 43. Each time the motor current exceeds the limit level, the output signal of the AND gate 43 is changed to low temporarily even when the drive command signal A3 is high. Thus, during the current limit operation, the MOSFET 24 is turned off temporarily to limit the motor current to be less than the limit level each time the motor current exceeds the limit level.

In this current limit operation, the output signal of the OR gate 41 is reversed to high during the turning off of the MOSFET 24. Thus, the MOSFET 23 is turned on to circulate the energy in the coil of the motor 13 through the circulation path 50.

If the motor lock disappears and the throttle valve 12 is rotated close to the target throttle position during this current limit operation, the motor current control is changed to the motor braking current control. When the motor current for the braking is started, the motor current decreases temporarily below the limit level. The output signal of the D-type flip-flop 37 changes to low, and the timer 38 is reset and produces the low level signal. Thus, the current limit operation is canceled. The motor 13 is driven with the motor current of 100% duty ratio in the reverse direction (C) to brake the throttle valve 12.

If the throttle valve 12 is not rotated closely to the target throttle position even when the current limit operation is continued, the engine control circuit 15 finally shuts off the current supply to the motor 13 in the following manner. The engine control circuit 15 measures the time period in which the difference between the actual throttle position and the target throttle position continues to exceed a predetermined reference. If the measured period reaches a predetermined period t4, the engine control circuit 15 determines it as the motor lock and changes all the drive signal levels to low. Thus, the current supply to the motor 13 is shut off.

Alternatively, the engine control circuit 15 may be connected to receive the output signal of the timer 38 as shown by a dotted line in FIG. 2. This output signal is a current limit monitor signal. The period of the high level of this monitor signal indicating the current limit operation may be measured, so that the engine control circuit 15 may shut off the current supply to the motor 13 by changing all the drive command signals to the low level. Although the motor current supply is controlled as described above and shown in FIG. 4 when the motor locks at the time of the motor drive starting, the motor current supply is controlled in the similar manner when the motor locks at the time of motor braking.

According to the first embodiment, the motor 13 is started (or braked) without limiting the motor current within the drive start time period (or brake period) set a little longer than the normal drive start time period (or normal brake time period). Therefore, the drive start torque (or braking force) can be increased more to improve the responsiveness of the throttle valve 12 than in the case of limiting the motor current from the beginning of the motor drive starting (or braking).

Further, the motor current is limited to a lower level, when the motor current continues to exceed the limit level for more than the predetermined period t38 during the period of the motor drive starting (or motor braking). Thus, the current flowing in the MOSFETs 22–25 can be limited to the lower level to reduce the heat generation of the MOSFETs 22–25. As a result, the motor current supply may be continued for a longer period to some extent, so that the nominal lock of the motor 13 may be eliminated by the continued application of the driving torque. Further, the size and cost of the MOSFETs 22–25 can be reduced in correspondence with the reduction in the heat generation of the same.

Second Embodiment

This embodiment is directed to a apparatus in which the motor 13 is capable of providing a sufficient torque. Therefore, the motor current supplied during the period of the motor drive starting (or motor braking) is limited at a high level, which will not lessen the motor drive starting (or braking) performance. However, when it is likely that the motor locks, the motor current is limited to a low level after the motor drive starting period.

Figure 5:
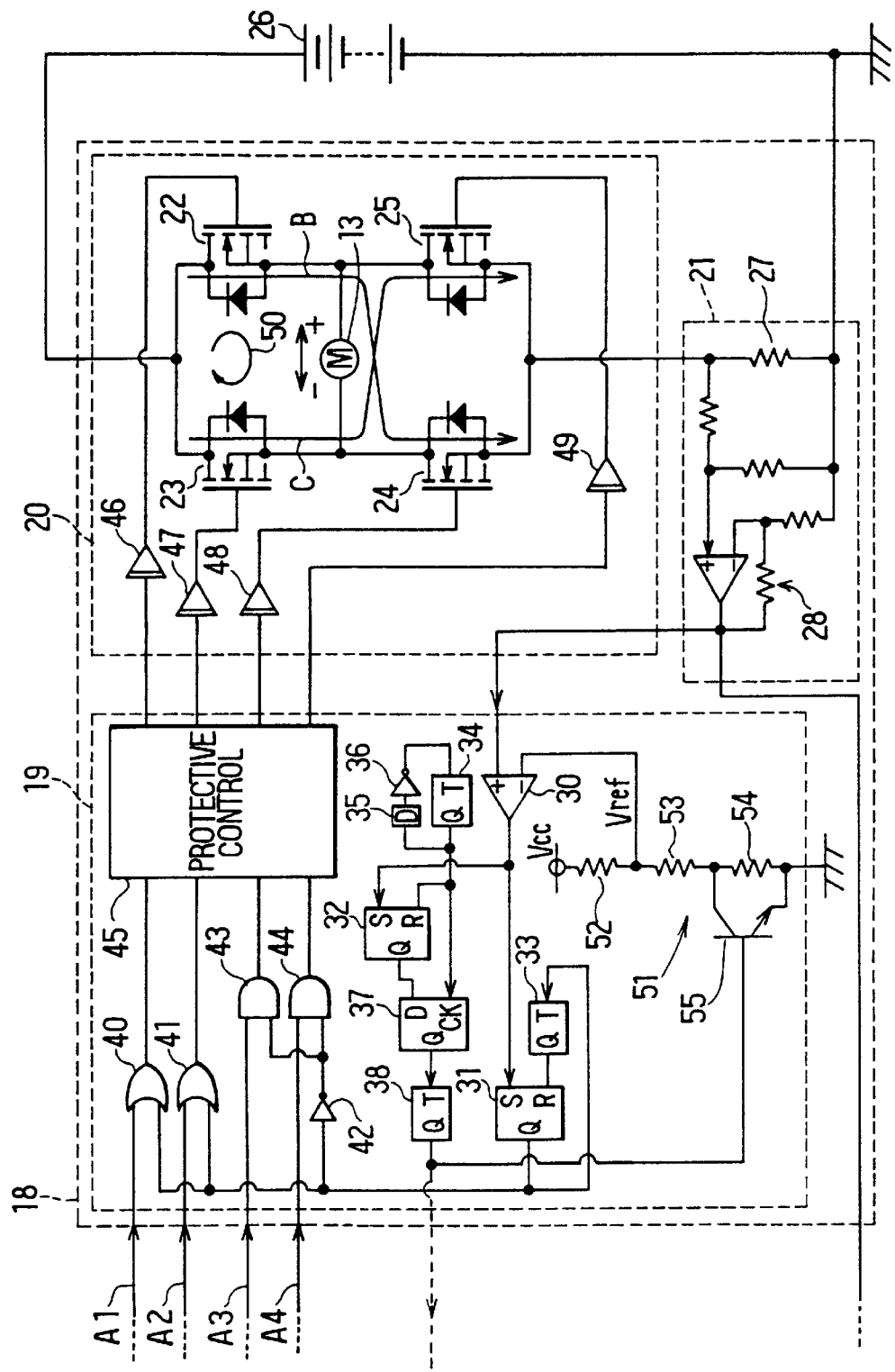
FIG. 5 is an electric wiring diagram showing a drive control circuit used in a motor drive control apparatus according to a second embodiment of the present invention.

In this embodiment, as shown in FIG. 5, a reference signal switching circuit 51 is provided in the drive logic circuit 19 to switch the reference signal Vref applied to the comparator 30 between a high level Vref(H) for the high limit level and a low level Vref(L) for the low current limit level. The switching circuit 51 has three resistors 52–54 connected in series between a power source Vcc and ground. A transistor 55 is connected across the ground-side resistor 54, and the junction between the resistors 52 and 53 is connected to the comparator 30.

The output of the RS-latch 31 is directly connected to the OR gates 40 and 41 without through AND gate (39 in FIG. 2), and to the AND gates 43 and 44 through the inverter 42. The output terminal Q of the timer 38 is connected to the transistor 55 to switch the reference signal Vref.

The second embodiment normally operates as shown in FIG. 6. That is, as the timer 38 normally continues to produce the low level signal, the transistor 55 is maintained turned off. As a result, the reference signal Vref is maintained at the high level Vref(H), which is determined as follows.

$$Vref(H)=Vcc\times(R53+R54)/(R52+R53+R54)$$

When the accelerator pedal 16 is stepped on further, the motor drive starting operation is effected in the same manner as in the first embodiment until the actual throttle position approaches the target throttle position. The motor current of 100% duty ratio is supplied to the motor 13 at the initial stage of the drive period t1. However, the RS-latch 31 produces the high level signal only during the period determined by the timer 33, each time the motor current exceeds the high limit level determined by the high reference signal Vref(H). This high level output signal is inverted to the low level signal by the inverter 42 and applied to the AND gate 43. As a result, the output signal of the AND gate 43 is changed to low temporarily each time the motor current exceeds the high limit level, even when the drive command signal A3 is high. Thus, the MOSFET 24 is turned off temporarily to restrict the motor current to be less than the high limit level by the reduced duty ratio.

During this current limit operation, the electromagnetic energy remaining in the coil of the motor 13 is circulated through the circulation path 50 by turning on the MOSFET 23 when the MOSFET 24 is turned off.

When the throttle valve 12 is rotated to a position within the predetermined range from the target throttle position, the motor current is reversed for motor braking. That is, at the initial stage of the braking period t2, the motor 13 is supplied with the motor current of 100% duty ratio. However, the RS-latch 31 produces the high level signal only during the period determined by the timer 33, each time the motor current exceeds the high limit level determined by the high reference signal Vref(H). Thus, in the same manner as in the drive period t1, the motor current is shut off temporarily to restrict the motor current to be less than the high limit level.

After the throttle valve 12 is rotated to the target throttle position, the motor 13 is supplied with the motor current of a duty ratio corresponding to the throttle position to maintain the throttle valve 12 at the target position during the time period t3 in the same manner as in the period t0.

The second embodiment will operate as shown in FIG. 7, when the motor locks. It is assumed that the motor locks at timing tx immediately after starting to drive the motor 13.

When the motor 13 locks, the throttle valve 12 will not be rotated to the target throttle position even when the motor 13 is driven with the motor current limited to the high limit level. Thus, if the period t1a of continuation of supplying the motor current in excess of the high limit level counted by the timer 38 exceeds the time period t38, the current limit operation is effected in the following manner to limit the motor current to the low limit level.

When the count time t1a of the timer 38 reaches the time period t38, the timer 38 produces the high level output signal.

The transistor 55 turns on in response to this high level signal to short the resistor 54. Thus, the reference signal Vref is switched to the low reference signal Vref(L) which corresponds to the low limit level and defined as follows.

$$Vref(L)=Vcc\times R53/(R52+R53)$$

This low limit level is set not to break the MOSFETs 22–25 even when the motor current of this low limit level is continuously supplied to the motor 13.

Thus, when the reference signal Vref is switched to the low reference signal Vref(L), the RS-latch 31 produces the high level signal only during the period determined by the timer 33, each time the motor current exceeds the low limit level. This high level signal is inverted to the low level signal by the inverter 42 and applied to the AND gate 43. Thus, the MOSFET 24 is turned off temporarily each time the motor current exceeds the low limit level to restrict the motor current to below the low limit level. The MOSFET 23 is turned on to circulate the electromagnetic energy remaining in the motor 13 through the circulation path 50 when the MOSFET 24 is turned off.

If the throttle valve 12 cannot be rotated to the target throttle position after the continuation of the supply of the motor current limited to the low limit level, the motor current is shut off in the similar manner as in the first embodiment. Although the motor current supply is controlled as described above and shown in FIG. 7 when the motor locks at the time of the motor drive starting, the motor current supply is controlled in the similar manner when the motor locks at the time of motor braking.

The second embodiment provides the similar advantages described with reference to the first embodiment.

In the foregoing embodiments, the motor current control may be effected by a programmed microcomputer in place of the drive logic circuit 19 constructed in a hard-wired form. Further, the motor current may be limited in two or more stages in accordance with the period of continuation of the motor lock. The MOSFETs 22–25 may be replaced with other switching devices. Still further, the motor current control may be applied only to the motor drive starting operation or the motor braking operation. The motor drive control may be applied to not only the engine throttle control but also to other devices.

The present invention should not be limited to the disclosed embodiments and modifications, but may be modified or altered further without departing from the spirit of the invention.

What is claimed is:

1. A motor drive method for a control object driven by an electric motor, said method comprising:
   supplying a motor with a motor current of a first level to move a control object from a first position toward a second position;
   measuring a time period of supplying the motor current of the first level; and
   reducing the motor current to a second level lower than the first level but not to a zero level, when the measured time period exceeds a reference time period which is set longer than a normal time period in which the control object is normally moved from the first position to the second position.

2. A motor drive method as in claim 1, further comprising:
   measuring a time period of supplying the reduced motor current of the second level; and
   shutting off the reduced motor current when the measured time period of the reduced motor current continues for more than a reference time period.

3. A motor drive method as in claim 1, wherein the control object is a throttle valve of an internal combustion engine.

4. A motor drive circuit for an electric motor, said circuit comprising:
   means for supplying a motor with motor current of a first level to move a motor-controlled object from a first position toward a second position;
   means for measuring a time period during which motor current of the first level is being supplied; and means for reducing the motor current to a second level lower than the first level but not to a zero level, when the measured time period exceeds a reference time period which is set longer than a normal time period in which the controlled object is normally moved from the first position to the second position.

5. A motor drive circuit as in claim 4 further comprising:

means for measuring a time period during which reduced motor current of the second level is being supplied; and means for shutting off the reduced motor current when the measured time period of the reduced motor current continues for more than a reference time period.

6. A motor drive circuit as in claim 4 wherein the controlled object is a throttle valve of an internal combustion engine.

* * * * *